Dec. 22, 1936.  G. LIWSCHÜTZ  2,065,473
APPARATUS FOR OPERATING MOVABLE MEMBERS
Filed April 27, 1935  6 Sheets-Sheet 1

Inventor:
Georg Liwschütz
by Karl Lenhens
Atty.

Inventor:
Georg Liwschütz

Dec. 22, 1936.     G. LIWSCHÜTZ     2,065,473
APPARATUS FOR OPERATING MOVABLE MEMBERS
Filed April 27, 1935     6 Sheets-Sheet 3

Inventor
Georg Liwschütz
by Karl Michaelis Atty

Dec. 22, 1936.                G. LIWSCHÜTZ                2,065,473
               APPARATUS FOR OPERATING MOVABLE MEMBERS
                  Filed April 27, 1935        6 Sheets-Sheet 4

Inventor:
Georg Liwschütz
by Karl Michaely
    Atty.

Dec. 22, 1936.　　　G. LIWSCHÜTZ　　　2,065,473
APPARATUS FOR OPERATING MOVABLE MEMBERS
Filed April 27, 1935　　　6 Sheets-Sheet 5

Inventor:
Georg Liwschütz
by Karl Chihak
Atty.

Dec. 22, 1936.   G. LIWSCHÜTZ   2,065,473
APPARATUS FOR OPERATING MOVABLE MEMBERS
Filed April 27, 1935   6 Sheets-Sheet 6

Patented Dec. 22, 1936

2,065,473

UNITED STATES PATENT OFFICE 2,065,473

APPARATUS FOR OPERATING MOVABLE MEMBERS

Georg Liwschütz, Berlin, Germany, assignor to Naamloose Venootchapp Adverteerings Maatschappij, The Hague, Netherlands Application April 27, 1935, Serial No. 18,558
In Germany May 8, 1934

14 Claims. (Cl. 46—120)

My invention relates to an apparatus for operating movable articles or figures, for instance display figures such as described in my co-pending application for patent of the United States, Ser. No. 590,118, filed February 1, 1932, for "Display figures". As described in my said co-pending application, the figures are equipped with movable limbs and bellows for moving the limbs and/or they are mounted to move on a suitable support and operatively connected to bellows for moving them on the support. The bellows for moving the limbs and the bellows, if any, for moving the complete figures are controlled by pneumatic means such as a tracker board and a perforated control sheet.

It is an object of my invention to provide an improved apparatus for operating movable articles or figures. To this end, in combination with a tracker bar, pipe lines connecting the tracker bar to the individual controlling means, for instance the bellows referred to, by which the movable parts of the articles or limbs of the figures, and/or the articles or figures themselves, are operated, a control sheet and means, such as a pair of reels, for moving the control sheet across the tracker bar; I provide a distributor casing in which the tracker bar is arranged, so that the passages in the tracker bar open into the casing, and means for connecting the casing to a source of potential energy, for instance a reservoir for compressed air or a vacuum tank. In a preferred embodiment of my invention I provide means for alternately breaking the connection of the casing to the source and establishing a connection of the casing to the atmosphere, a talking machine, a motor for operating same, means for operatively connecting the reels to the motor, reversing means under the control of the control sheet for alternately throwing in and out the means whereby the motor is operatively connected to the reels, and means operatively connected to the reversing means for making and breaking the connection of the distributor casing to the atmosphere.

By these means I obtain a greater variety of movements of the articles or figures operated by the apparatus. Further the speed of each movement may be adjusted at will in the manner explained hereinafter by which it is possible to carry out some portions of a movement, if desired, at different speeds.

Preferably the tracker bar is equipped with separate passages for automatically returning the parts of the apparatus, including the talking machine, to their respective initial positions, in which they are ready for another cycle of operations, which may be repeated as often as desired.

In the drawings affixed to this specification and forming part thereof apparatus, articles, and figures embodying my invention are illustrated diagrammatically by way of example.

In the drawings

Figs. 1 to 4 illustrate a distributor casing which is connected to a supply of compressed air.

More particularly

Figs. 6 to 9 illustrate two devices for rapidly deflating bellows.

More particularly,

Figs. 12 to 14 illustrate a portion of a limb, for instance an arm equipped with bellows at the joints for bending and stretching it in a single plane only.

More particularly,

Figs. 15 to 17 illustrate a portion of a limb, for instance, an arm, equipped with bellows at the joints as shown in Figs. 12 to 14, but for bending and stretching the limb in two planes at right angles to each other.

More particularly

Fig. 20a shows a modification of the figure shown in Fig. 20, Figs. 21 and 22 are partly sectional elevations of a figure which alternately rises from, and sits down on, a seat, and Fig. 23 is an elevation of a limb whose joint is a bellows operated by vacuum.

Figs. 25 and 26 are, at an enlarged scale, a plan view and a side elevation, partly in section, of a compartment forming part of the cupboard shown in Fig. 24.

Referring to the drawings and first to Figs. 1 to 5, 1 is a distributor box mounted on suitable feet 2, and 3 is a talking machine mounted on its top. The talking machine, which may be of any suitable type, is equipped with the usual sound arm 4, a pick-up 5 at the free end of the sound arm, a record plate 6 which is rotated by an electric or spring-operated motor in a box 7, and a screw 54 for securing a record 52 to the record plate 6.

A driving shaft 8 for the control sheet 9, (Fig. 3) extends from the motor box 7 and is splined for the reception of a clutching member 22 for alternately operating the two reels 10 and 11 of the control sheet 9, as will presently be described. The reels 10 and 11 are mounted to rotate in the casing 1 on suitable shafts 10' and 11', respectively, and the control sheet 9 is connected to the respective reels by tacks or hooks 24 and 25. The reel 11 is of smaller diameter than the reel 10. The control sheet is usually made of paper but may be made of any other suitable material.

Figure 4:
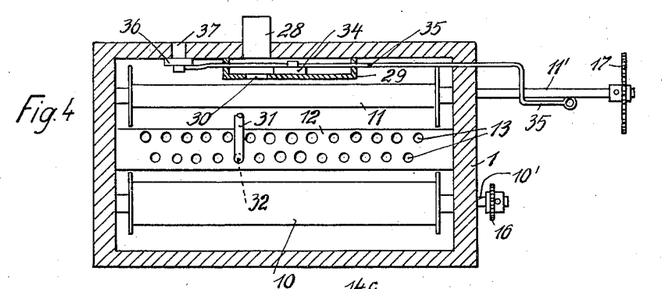
Fig. 4 is a section on the line IV—IV in Fig. 3.
Figure 5:
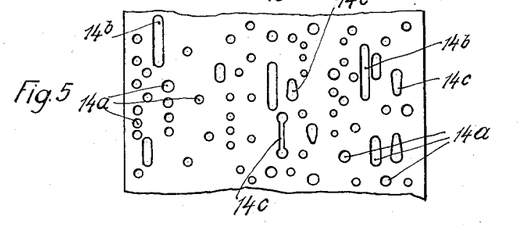
Fig. 5 shows a portion of a control sheet with perforations of various shapes and forms.

The reels are arranged at opposite sides of a tracker bar 12 which is formed with two rows of passages 13, and the control sheet 9 is drawn across the tracker bar by the reels 10 and 11. Preferably the passages of the several rows are arranged in staggered relation to each other as shown in Fig. 4. The control sheet, as shown in Fig. 5, is formed with holes 14, and the passages 13 are connected to the interior of the casing 1 when one of the holes registers with the upper end of one of the passages 13. The passages 13 are connected, respectively, to pipes 15 extending to the bellows, or other pneumatic means, of the articles or figures, to be operated, and to pipes such as 32, 33, for controlling bellows 38 and 39 by which the reels 10 and 11 are reversed.

Figure 1:
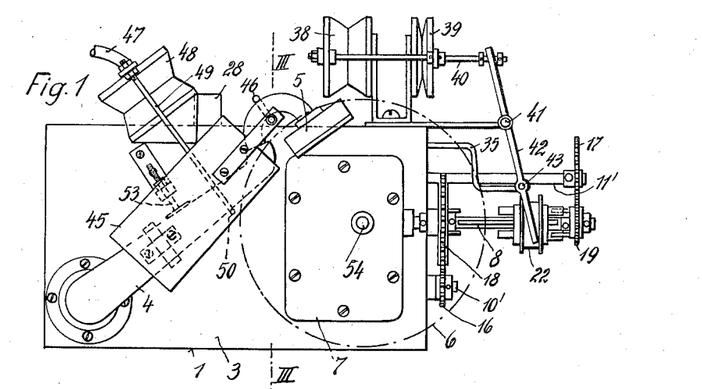
Fig. 1 is a plan view.
Figure 2:
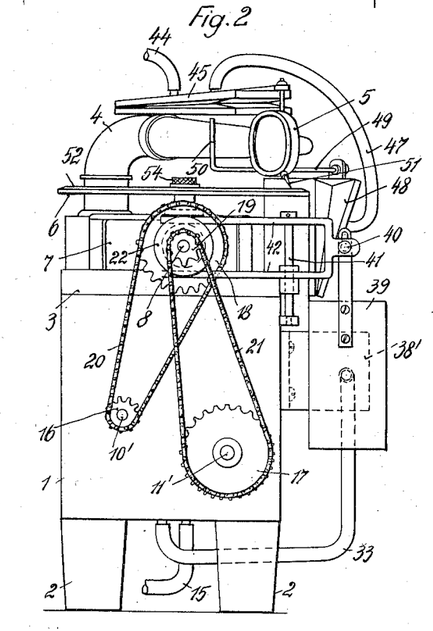
Fig. 2 an end elevation of the casing, viewed from the right in Fig. 1.

The shafts 10' and 11' of the respective reels 10 and 11 extend beyond the end wall of the casing 1 at the right in Fig. 1. A sprocket 16, of small diameter, is keyed on the shaft 10' of the larger reel 10, and a sprocket 17, of larger diameter, is keyed on the shaft 11' of the smaller reel 11. A sprocket 18, of large diameter is free to turn on the motor shaft 8, and is connected to the small sprocket on shaft 10' by a chain 20. Another sprocket 19, of smaller diameter than the sprocket 18, is also free to turn on the motor shaft 8, and connected to the large sprocket 17 on shaft 11' by a chain 21. The clutching member 22 which is splined on the motor shaft 8 is alternately connected to the sprockets 18 and 19 by means to be presently described. Obviously, other means than chains and sprockets might be provided for alternately operating the shafts 10' and 11' from the motor shaft 8. In the neutral position of the clutching member 22, both reel shafts 10' and 11' are idle.

With the ratios of sprocket diameters illustrated, and with the motor shaft 8 rotating at uniform speed, the larger reel 10 rotates faster than the smaller reel 11, so the the control sheet 9, when wound on the smaller reel 11, moves slowly across the tracker bar 12. On the other hand, when the mechanism is reversed and the larger reel 10 winds up to the control sheet 9, the control sheet moves at a much faster rate. The slow movement of the control sheet corresponds to the operation of the articles or figures, i. e., to the actuation of their pneumatic means and/or the means for moving the complete articles or figures, while for the fast return the articles or figures are at rest, being arrested by a control to be described hereinafter.

A pipe 28 in one of the side walls of casing 1 is connected to a supply of compressed air by a flexible or other pipe connection 28', as this apparatus is operated under increased pressure. However the apparatus, if suitably modified, might also be operated under reduced pressure, and in this case the pipe 28 is connected to a vacuum tank (not shown). Obviously the casing must be airtight in both cases. A valve chest 29 is arranged to surround the opening of the pipe 28 into the casing 1, and has a port 30 formed in its side wall. A pipe or knee 31 extends inwardly from the side wall and opens just above that one of the passages 32 which is connected to the pipe 33, and, through this pipe, to the reversing bellows 38. A valve rod 35 is mounted to slide in the end walls of the valve chest 29 and is connected to a slide valve 34 in the chest which slide valve controls the port 30. Another slide valve 36 is secured to the valve rod 35 at that end which extends from the rear end wall of the valve chest, for controlling a port 37 in the adjacent side wall of casing 1.

In its initial position which corresponds to the operation of the articles or figures, the valve 34 exposes the port 30 in the inner wall of the valve chest 29, and the valve 36 closes the port in the side wall of the casing 1. The pipe 28 is now connected to the casing and the casing is supplied with compressed air. When the apparatus is reversed and the articles or figures are arrested, the slide valve 34 closes the port 30 and breaks the connection of pipe 28 to the casing, while the slide valve 36 exposes the port 37 and connects the casing to atmosphere. The compressed air now escapes from the casing, or, if the casing is operated under reduced pressure, the ambient air penetrates into the casing.

For reversing the apparatus, I have provided the two reversing bellows 38 and 39. The bellows are secured to the shanks of a U-shaped bracket 38', Fig. 1, on the casing 1, and are operatively connected to a reversing rod 40 which reciprocates as the bellows are alternately deflated and inflated. In the position illustrated in Fig. 1, the bellows 38 is inflated and has pulled the reversing rod 40 to the rear. The free end of the rod is connected to one end of a doublearmed clutching lever 42 which is fulcrumed at 41, and the clutching member 22 which is engaged by the other end of the lever, connects the sprocket 19 to the shaft 8, operating the shaft 11' of the smaller reel 11. The valve rod 35 is pivotally connected to the clutching lever 42 at 43, and in the position illustrated the slide valve 34 exposes the port 30, admitting air under pressure from pipe 28 to the casing 1, while at the same time the slide valve 36 closes the port 37, so that the air is retained in the casing.

Bellows 38 is connected to one of the passages 13 of the tracker bar 12 by pipes 32 and 33, and another pipe, not shown, connects the other bellows 39 to another passage of the tracker bar 12.

Figure 3:
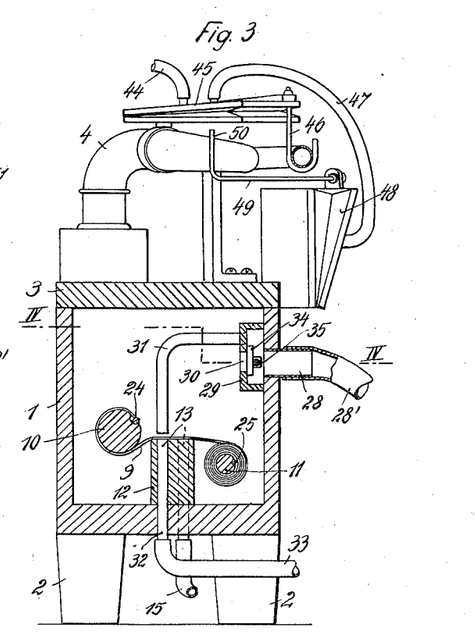
Fig. 3 is a section on the line III—III in Fig. 1.

A third extra pipe 44 is connected to still another passage 13 of the tracker bar 12, and to a bellows 45 which is arranged above the sound arm 4 and at its front end has a hook 46, Fig. 3, for raising the sound arm 4 when the bellows is inflated, so that pick-up 5 clears the groove of the record 52.

The arm-raising bellows 45 is connected, by a pipe 47, to an arm-shifting bellows 48 at one side of the casing 1, and a horizontal bar 49, with upturned end 50, is secured to the arm-shifting bellows 48. When inflated, the shifting bellows 48, through bar 49, moves the sound arm 4 into the position illustrated in Fig. 1 in which the needle of the pick-up 5 just engages in the outermost groove of the record groove.

In operation, the bellows 45 is first inflated, raising the sound arm 4, and then the bellows 48 is inflated, shifting the arm into its outermost position. When the arm-raising bellows 45 is cut off from the supply of compressed air by the control sheet 9, the weight of the sound arm 4 returns the bellows into its folded position. The bellows 48 is returned into its folded position by the movement of the sound arm 4 along the record groove.

It is important that the sound arm 4 should always be in the same position, i. e. at the outermost end of the record groove, when the record 52 is started. To this end, an adjustable check 53 is provided for the sound arm by which the movement imparted to the sound arm by the shifting bellows 48 is limited, and, in addition, a mark, not shown, is arranged at the record plate 6 which, when the record 52 is placed on the record plate, registers with a mark, not shown, on the plate, whereupon the record is fixed by screw 54.

When a given record has been fixed on the plate 6 as described, and a corresponding control sheet 9 has been secured to the reels 10 and 11, the performance of an article or a figure, or a scene acted by a plurality thereof, may be repeated as often as desired.

At the beginning of an operation, the control sheet 9 is wound on the larger reel 10 for substantially its full length. The reversing bellows 38 is inflated through pipes 32, 33 and the clutching member 22 connects the sprocket 19 to the motor shaft 8, driving the smaller reel 11 when the motor in the box 7 is started and rotates the shaft 8. The record plate 6 is rotated at the same time and the record 52 is scanned by the pick-up 5 while the control sheet 9 is drawn slowly across the tracker bar 12. The holes 14 in the control sheet register with the passages 13 in the tracker bar 12 and temporarily connect the interior of casing 1 to the respective passages, admitting air to the bellows or other pneumatic means by which the articles or figures are operated and/or moved, the articles or figures now performing movements which correspond to the music or speech of the talking machine. As described, in the position illustrated in Fig. 1, the slide valves 34 and 36 are in the position illustrated in Fig. 4, the interior of the casing being open to pipe 28, and closed to atmosphere.

At the close of the performance, when the control sheet 9 has been wound on the small reel 11, as shown in Fig. 3, a hole in the control sheet connects the interior of the casing 1 to the deflated reversing bellows 39 through one of the passages 13 of the tracker bar 12, and the pipe line which has not been shown. Air under pressure is admitted to bellows 39 and inflates it while the supply of compressed air to the bellows 38 is interrupted so that this bellows is folded when 39 is inflated, the air escaping through an opening in the bellows 38. The inflated bellows 39 now throws over the clutching lever 42 and connects the other sprocket, 19, on shaft 8 to the shaft through member 22. Reel 10 is now rotated at high speed, on account of the ratio of sprockets 16 and 18, and the control sheet 9 is wound rapidly on the larger reel 10. The slide valves 34 and 36 are also reversed, as their rod 35 is connected to lever 42 at 43, closing port 30 and exposing port 37. The interior of the casing is now disconnected from the supply of compressed air through pipe 28, and connected to atmosphere. Only at the lower end of pipe or knee 31, the air pressure in the valve chest 29 still acts on the control sheet 9. The lower end of pipe 31, however, is practically closed by the control sheet 9. Therefore, the bellows of the articles or figures are not inflated during the return movement of the control sheet, and the articles or figures do not move. When the control sheet 9 has completed its return movement, a hole in the control sheet registers with the lower end of pipe 31 and the pressure from valve chest 29 and pipe 28 is transferred to the other reversing bellows 38 through valve chest 29, pipe 31, pipe 32 in the corresponding bore 13 of the tracker bar 12, and pipe 33. This bellows is now inflated, returning the parts into the position illustrated in Figs. 1 and 4, and the apparatus is ready for another cycle. When the clutching member 22 has been thrown over, the bellows 45 and 48 for the control of sound arm 4 are operated by compressed air admitted through a suitably positioned hole in the control sheet 9, the raising bellows 45 being operated first. The subsequent operation of bellows 45 and 48 might also be effected by controlling the bellows through separate pipe lines, not shown, from the tracker bar 12 which are opened in sequence by holes in the control sheet. The bellows 45 and 48 now raise the pick-up 5 from the record groove, and immediately after, return the sound arm to its outermost position, Fig. 1, whereupon they are deflated in the manner described.

It will be understood that while the motor in the box 7 rotates its shaft 8, and the interior of the casing is supplied with air under pressure through pipe 28, or connected to a vacuum tank, as the case may be, the apparatus operates quite automatically and repeats the performance within the predetermined periods, these being a comparatively long operating period and a short return period.

The bellows which are controlled from the tracker bar 12, perform various functions and must overcome widely different resistances. Their demand of energy is in proportion to the power they are called upon to develop, and this is preferably considered by adapting the free sectional areas of the passages 13 and the pipe lines connecting them to the bellows, to the individual demands of the bellows. In Fig. 4 the passages 13 are all shown with the same inside diameter, but for the sake of convenience only.

It may also be desirable that a given bellows should be operated at a faster rate at one time, and a slower rate at another time, or it may be desirable that a bellows should perform its inflation movement at distinct velocities, for instance, perform the first, or any other, stage of its inflation movement at a faster rate than the second or any other stage, or vice versa.

All these functions are accomplished according to my invention in a very simple manner, by suitably determining the sizes of the individual holes 14 in the control sheet 9. By varying the width of the holes, the amount of air admitted to the passages in the tracker bar is varied, and the corresponding bellows is expanded at a faster or slower rate. The period during which a bellows remains inflated, is determined by the length of the holes. Fig. 5 shows a control sheet 9 which, in addition to circular holes 14a corresponding to movements of short duration, has elongated parallel holes or slots 14b, and elongated holes or slots 14c whose width is varied from one end of the slot to the other. Such elongated holes serve for maintaining a part of a figure in a given position for a longer period.

Figure 11:
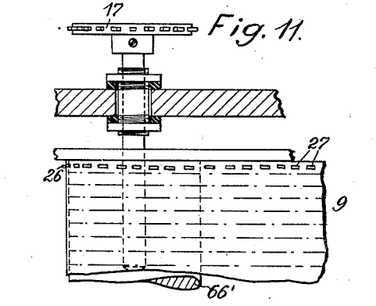
Fig. 11 is a detail showing a portion of the control sheet in Fig. 10 and of the feeding cylinder for the sheet.

My invention also relates to a method of making control sheets, as follows: An unperforated control sheet, preferably marked with parallel longitudinal lines, one for each bellows to be operated, as shown, for a modified apparatus, in Fig. 11, is moved at a velocity which is equal to its operating velocity. For instance, the casing 1 is opened so that the control sheet is accessible, and the reels 10 and 11 are rotated from shaft 8 in the manner described. While the control sheet is moved, the talking machine is operated and the points at which the articles, or figures, should perform certain movements in accordance with the speech, or music, of the talking machine, are marked on the parallel lines of the control sheet above the corresponding passages 13 of the tracker bar 12. Such marks are lines of various lengths and determine the size of the holes 14a, 14b or 14c to be made in the control sheet.

In some cases it is desirable to rapidly deflate a bellows after it has been inflated. Normally, the air outlet openings of the bellows are so small as not to interfere with the inflation of the bellows, and with their remaining in inflated condition, while they are supplied with compressed air from casing 1 through the holes 14 in the control sheet, and the passages 13 of the tracker bar 12. When the supply is cut off, the air escapes from the interior of the bellows through the small openings and the bellows fold. This folding, however, occurs too slowly for some purposes, and means for effecting more rapid folding, will now be described with reference to Figs. 6 to 9.

Figure 6:
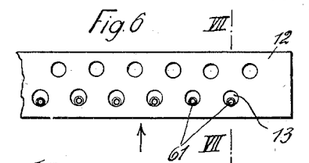
Fig. 6 is a plan view of the tracker bar.
Figures 7, 9:
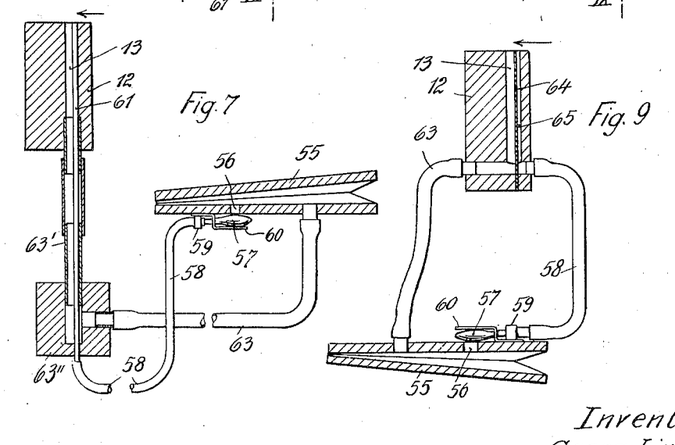
Fig. 7 is a section on the line VII—VII in Fig. 6, illustrating a device in which pipes are inserted in the passages of the tracker bar for controlling the inflation and deflation of the bellows.
Fig. 9 is a section on the line IX—IX in Fig. 8, of a device in which the small pipes are replaced by subsidiary passages partitioned from the passages of the tracker bar.

Referring first to Figs. 6 and 7, 55 is a bellows for performing some function on, or with respect to a figure, not shown, or for reversing the apparatus, like bellows 38, 39, or for any other purpose. The passages 13 of the tracker bar 12 past which the control sheet (omitted) moves in the direction of the arrows, are connected to pipes 63' which open into a cavity in a block 63", and this cavity is connected to the bellows 55 by a pipe 63.

The opening 56 for deflating the bellows 55 is comparatively large and is controlled by a valve in the shape of an inflatable rubber bag 57, with a small opening, which exposes the opening 56 when deflated, and closes it when inflated. The valve 57 is supported by a suitable bracket 60 and connected to an air supply pipe 58 at 59. The pipe 58 is connected to a pipe 61 which is inserted in a passage 13 of the tracker bar 12 in eccentric position, as best seen in Fig. 6, the pipe 61 being placed at that side of the passage which is first laid open by a hole in the control sheet 9, as it moves in the direction of the arrow, so that, when a passage 13 is exposed by a hole, the valve 57 is first inflated closing opening 56, and then the bellows 55 is expanded by the air admitted through pipes 63' and 63. When the supply of air to pipe 61 is interrupted, the valve 57 is emptied very rapidly through its small outlet opening and lays open the large opening 56, in the bellows 55, so that the air from the bellows 55 is discharged rapidly, and the bellows 55 folds immediately.

As described, air is first admitted to the pipe 61 when a hole in the control sheet registers with a passage 13, inflating the valve 57 and closing the opening 56. Thereupon, the air admitted through passage 13 and pipes 63', 63 inflates the bellows 55. The bellows 55 and the valve 57 remain inflated while a hole in the control sheet registers with the passage, but as the rear end of the hole moves across the passage 13, the air supply to the valve 57 is interrupted, and the valve is deflated rapidly. Subsequently, the air supply to the bellows 55 is also interrupted and the bellows folds immediately, as the large opening 56 is now available for the escape of the air.

Figure 8:
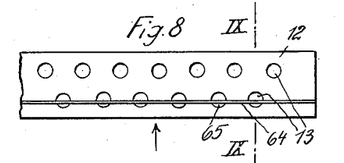
Fig. 8 is a plan view of the tracker bar.

Referring now to Figs. 8 and 9, the bellows 55 and its accessories including the valve or bag 57, are provided as described, but the block 63" is dispensed with, and the pipe 63 is directly connected to the passage 13 in the tracker block 12. Instead of inserting pipes 61 in the passages 13, a portion of every passage is partitioned by a transverse wall 64 which subdivides the passages into a portion of larger free sectional area which is connected to pipe 63, and a portion 65, of smaller free sectional area, which is connected to the pipe 58 and to the valve 57. The smaller portion 65, like the pipe 61, is so arranged in every passage 13 that it is exposed first as the control sheet 9 moves in the direction of the arrow. The operation is the same as described with reference to Figs. 6 and 7. The tracker block illustrated in Figs. 8 and 9 is obtained by boring its passages in the usual way, dividing the block in the plane of partition by sawing through the passages 13 where the wall 64 is to be inserted, placing the wall between the two portions of the tracker bar, and connecting the parts by gluing.

Figure 10:
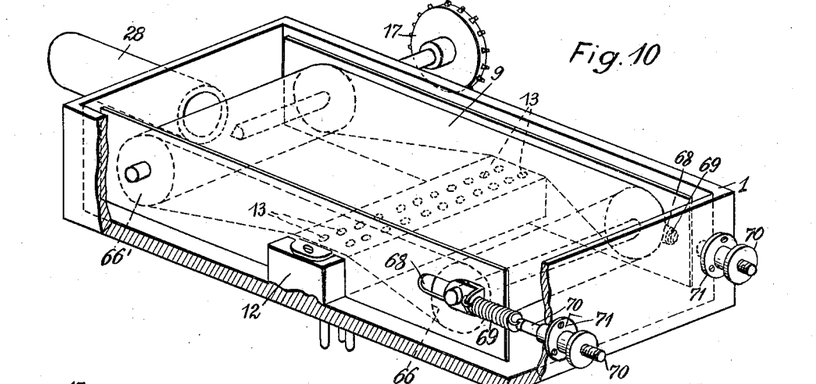
Fig. 10 is a perspective view of a distributor casing with an endless control sheet.

In some cases, the control sheet 9 may be an endless band as shown in Fig. 10. The casing 1, with the supply pipe 28 and the tracker bar 12, is provided as described, but the reels 10 and 11 are replaced by cylinders 66 and 66' mounted to rotate in suitable bearings provided in metal sheet members 67 arranged parallel to the longitudinal inner side walls of the casing 1. The cylinder 66' is driven by the motor for instance of the talking machine through a sprocket 17 keyed on the shaft of the cylinder. The bearings of the cylinder 66 are formed as slots 68.

69 are tension springs arranged so as to exert on the cylinder 66 a force by which the control sheet 9 will be stretched and closely held against the tracker bar 12 at sufficient pressure. 70 are screw bolts adjustably arranged in sockets 71, respectively, by means of which the tension of the springs 69 may be adjusted. In operation, the sheet members 67 form a guide for the endless control sheet 9. If desired more than two cylinders may be provided, the control sheet being arranged in a plurality of turns.

In order to eliminate the influence of stretching of the control sheet which might interfere with the exact operation of the apparatus, positive driving means such as a sprocket 26, Fig. 11, engaging in sprocket holes 27 of the control sheet, may be provided on the cylinder 66 at the left, so that the control sheet is fed by positive means.

Figures 12, 13, 14:
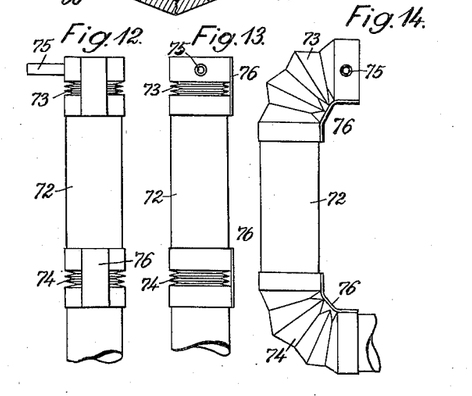
Figs. 12 and 13 are elevations of the arm, stretched, Fig. 13 being viewed from the left in Fig. 12.
Fig. 14 is an elevation, viewed as in Fig. 13 and showing the arm bent.

Referring now to Figs. 12 to 14, 72 is a limb of a figure, for instance, a member representing an upper arm. The joints connecting the upper arm to a shoulder portion 72', and to the forearm 72", comprise a strip 76 of leather or other flexible material, and a bellows 73, at the shoulder, and a strip 76' and a bellows 74, at the forearm. Air is supplied to the bellows 73 at the shoulder through a pipe 75, and the bellows 74 is supplied through the upper arm 72 which is preferably tubular. The pipe 75 is connected to one of the passages 13 in a tracker block 12. The air, after operating bellows 73, flows to the bellows 74 and, if desired, to other bellows, not shown, at the wrist, through the tubular forearm 72". The leather strips 76 and 76' replace pivots and, by their one-sided arrangement, cause the bellows to expand to a considerable extent at the sides which are remote from the strips, and to a much lesser extent at the sides adjacent the strips, as shown in Fig. 14 which illustrates the bent position of the arm.

Figures 15, 17:
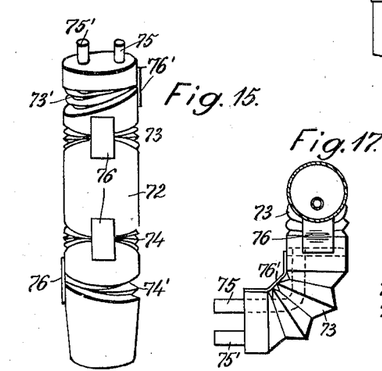
Fig. 15 is an elevation of the arm, stretched.
Fig. 17 is a section on the line XVII—XVII in Fig. 16.
Figure 16:
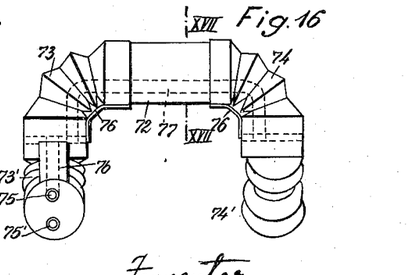
Fig. 16 is an elevation of the arm, bent.

The connection illustrated in Figs. 12 to 14 permits bending in a single plane only. If it is desired to perform movements in more than one plane, for instance, in two planes at right angles to each other, a connection as shown in Figs. 15 to 17 will be provided. The limb 72, representing an upper arm, the shoulder 72' and the forearm 72", are provided as described. In this instance, however, each joint comprises a pair of bellows. The bellows 73 and 74, with leather strips 76 and 76', are provided as described, but in addition, a bellows 73', with leather strip 73", and a bellows 74', with leather strip 74", are provided at the shoulder 72' and at the forearm 72", respectively, so that double joints are obtained. Obviously, I am not limited to two bellows per joint, but may provide any number of bellows, as required for a particular kind of movement. In the double joints illustrated, the leather strips or pivots of the two bellows of a joint are arranged at right angles to each other so that the bellows also perform movements at right angles to each other. Bellows which are inflated in a joint, for instance, the bellows 73 and 73' at the shoulder, perform movements in planes at right angles to each other, as shown in Figs. 16 and 17.

The supply of compressed air is so arranged that one of the bellows at one joint, and one of the bellows at the other joint, are inflated at the same time. The air supply pipe 75 extends to the bellows 73 through the bellows 73', which it does not supply, and 73 is connected to 74 through the hollow upper arm 72. When air is admitted through pipe 75, the bellows 73 and 74 are inflated together. The bellows 73' is provided with another supply pipe 75' and connected to the bellows 74' through a pipe 77 which extends through bellows 73 and 74, and through the tubular upper arm 72. By these means, when air is admitted to pipe 75', the bellows 73' and 74' are inflated together. The pipes 75 and 75' may be connected to pipe lines, not shown, which extend through other hollow limbs, or are directly connected to such hollow limbs.

By providing tubular or hollow rigid limbs which form part of the air ducts, the design of the figures is much simplified, and, in particular, the air ducts formed by the limbs are invisible, as the limbs normally are concealed by articles of dress, such as sleeves, trousers, etc.

It is to be understood that the links 72 shown in Figs. 12 to 15 may represent portions of a hand or of a finger. By means of the joints shown in Figs. 12 to 17 a gripping hand may be designed which is adapted to take an article and to let it go again. A hand thus constructed will not require separate pipes leading to the several fingers since the body of the hand and the movable fingers may be made hollow.

Figures 18, 19:
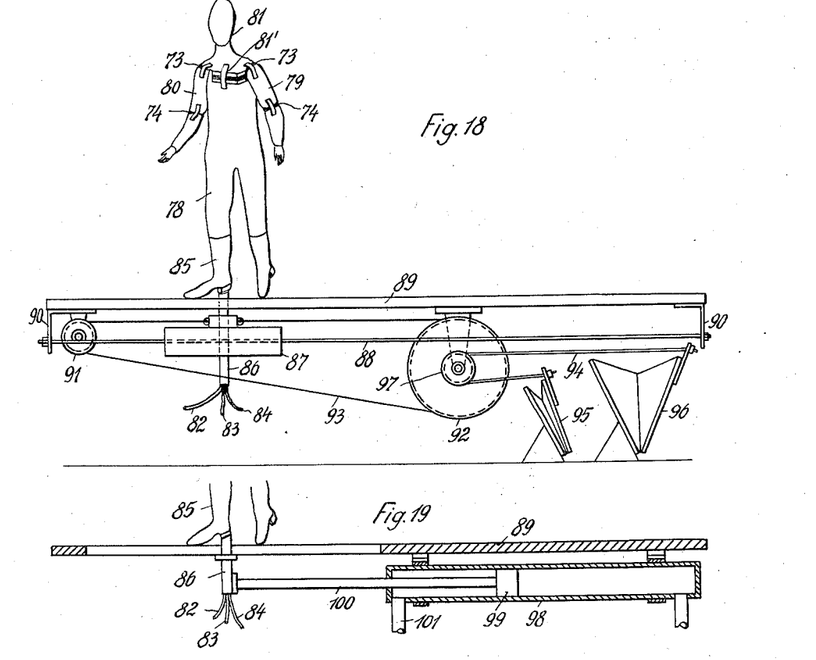
Fig. 18 is an elevation of a platform, a figure mounted to move on the platform, and bellows for moving the figure.
Fig. 19 is a section showing only the platform and the lower portion of the figure, with a pneumatic cylinder for moving the figure.

Referring now to Fig. 18, a figure 78 is mounted to move along a platform 89. This figure has movable arms 79 and 80, with joints comprising, for instance, bellows 73 and 74, or pairs of bellows 73, 73', and 74, 74', as described with reference to Figs. 12 to 17, or any other means. It also has a movable neck and a movable head 81, with a joint or bellows 81'. The joints or bellows of each arm 79 and 80 are operated together so that each arm requires only one supply pipe 82 and 84, respectively, and a third pipe 83 is provided for the joint 81. The three pipes are all that is required for operating all the joints of the figure 78, and the three pipes are introduced through a foot 85 of the figure, and a hollow support 86. It is to be understood that in this manner any other limb of a figure, for instance an eye, the mouth, or a hand may be actuated without impairing the movability of the figure as a whole.

The hollow support 86 is secured to a carriage 87 arranged below the platform or the like 89, and mounted to slide on a rod 88 whose ends are supported by brackets 90 below the platform 89. The platform is slotted for the reception of the support 86, as shown in Fig. 19, so that the figure is free to move with its carriage 87. The carriage is moved by means of a cable 93 on sheaves 91 and 92, the ends of the cable being attached to the carriage. The sheave 92 is rotated by a cord pulley 97 on its shaft, a cable 94, and bellows 95 and 96 to which the ends of the cable 94 are secured. By inflating one of the bellows, for instance 96, as shown, and deflating the other bellows 95, and vice versa, the pulley 97 is rotated and rotates the sheave 92 so as to move the carriage 87 to the left or to the right. The bellows 95 and 96, and the bellows at the joints of the figure 78, are operated by a control sheet and tracker bar in the casing 1, as described above. Obviously, the pipes 82, 83 and 84 which are connected to the figure, are flexible and so long that they will not interfere with the movement of the carriage 87.

Referring now to Fig. 19, this shows a modified mechanism for moving the figure 78 whose feet and support 86 only are shown. The carriage 87 and the cables 93 and 94 are dispensed with, and the support is connected to the rod 100 of a piston 99 in a cylinder 98 below the platform 89. The cylinder has air inlet and outlet pipes 101 and 102 at opposite ends which are controlled by a control sheet 9 and a tracker bar 12 for reciprocating piston 99 and moving the figure 78 along the platform. If desired the pipes 82 etc. may be introduced into the figure from the back so that the feet may be designed movable in order to imitate a walking of the figure.

Figure 20:
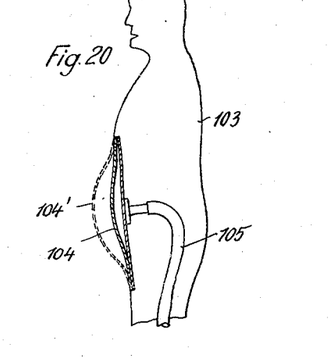
Fig. 20 is a, partly sectional, elevation showing part of a grotesque figure, with an inflatable belly.

Grotesque effects may be accomplished in various ways according to my invention. By way of example, Fig. 20 shows a figure 103 with a belly 104, of expansible material, whose interior is an air chamber and is connected to a tracker bar 12 by a pipe 105, in order to inflate the belly at given periods, as shown in dotted lines at 104'. Obviously, other parts of the body, for instance the chest, may also be inflated.

Figures 20A, 25, 26:
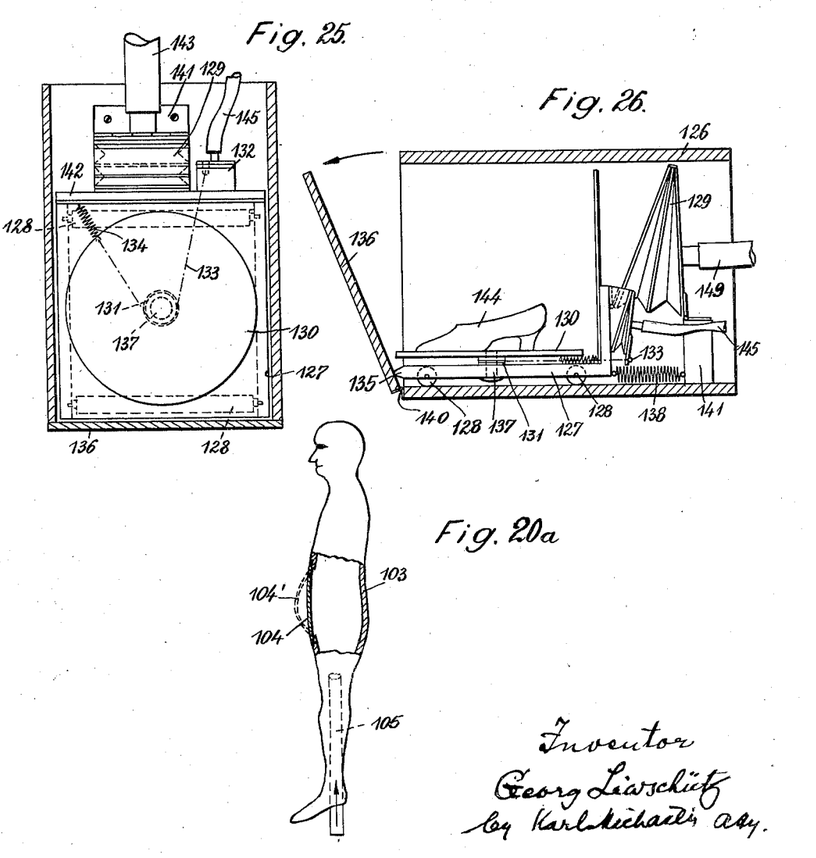

In the embodiment shown in Fig. 20a the figure 103 is substantially hollow, the pipe 105 being arranged in a leg of the figure and opening into the hollow interior thereof. This construction is particularly adapted for small figures. If desired other expansible portions besides or instead of the belly 104 may be provided.

Figures 21, 22, 23:
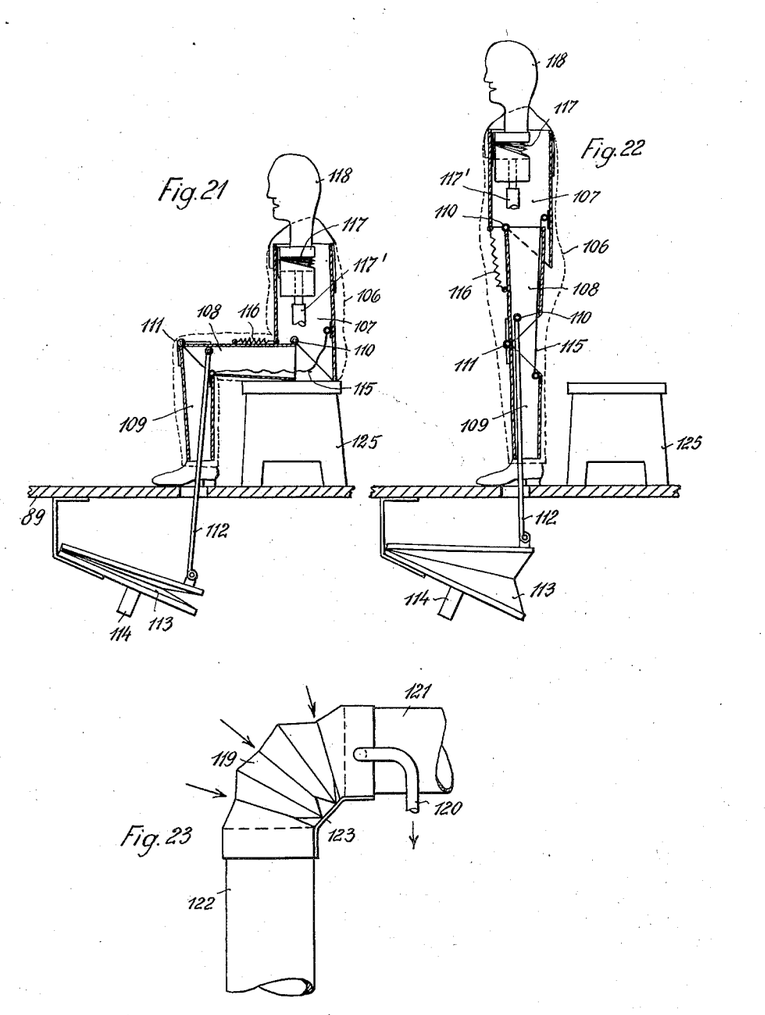

Referring to Figs. 21 and 22, these illustrate a figure which assumes a sitting as well as a standing position under the control of a tracker bar 12. The figure is mounted on a platform 89 in front of a seat 125, and its shanks 109 are fixed on the platform.

The body 107 of this figure is connected to the thighs 108 by joints 110 and the thighs are connected to the shanks 109 by joints 111. For operating the joints 111, a bellows 113 is arranged below the platform 89 and connected to one of the thighs by a rod 112. 114 is a supply pipe for admitting air to the bellows from a tracker bar 12. When the bellows is inflated, it raises the rod 112 and the thighs 108 and the figure rises from its seat 125, as shown in Fig. 22. Tilting forward of the body in the standing figure is prevented by a cord 115 connecting the body 107 to one of the shanks 109. A spring 116 connects the body 107 and the thighs 108 and effects proper movement from one position to the other.

The figure may be equipped with any joints for moving its limbs, and a joint or bellows 117 for moving its head is shown. A pipe 117' connects this joint or bellows to a tracker bar 12.

As mentioned, the apparatus may also be operated under reduced pressure by connecting its casing 1 to a vacuum tank. In this case, the bellows are not inflated but deflated for operating the parts to which they are connected.

Fig. 23 shows a bellows or joint 119 connecting two limbs 121 and 122. The limbs are connected, in addition to the bellows 119, by a strip 123 of leather or the like which acts as a pivot in the manner described. 120 is a pipe connecting the bellows to a tracker bar which, in this instance, is arranged in a casing such as 1 whose interior is connected to a vacuum tank or the like. When a passage in the tracker bar is exposed by a hole in the control sheet, the pressure reduction in the casing 1 is transferred to the bellows 119. Fig. 23 shows the normal position of the two limbs in which they are bent. If a pressure reduction occurs in the bellows 119, the atmospheric pressure acts in the direction of the arrows and the bellows contracts or folds, moving the limbs into stretching position. The leather strip or pivot 123 causes one-sided expansion of the bellows, as described with reference to Figs. 12 to 17.

Figure 24:
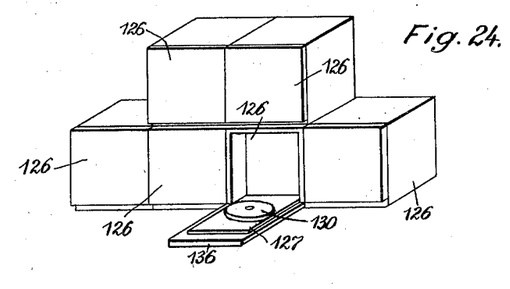
Fig. 24 is a perspective view of a cupboard comprising a plurality of compartments with movable parts operated by bellows.

Referring now to Fig. 24 a cupboard is shown comprising a plurality of compartments 126. Each compartment is designed as an individual in the manner described hereinafter so that any desired number of compartments may be combined in order to form a cupboard. The construction of the individual compartments is more clearly shown in Figs. 25 and 26 from which it will be seen that the compartment contains a movable support 127 running on rollers 128. The front wall 136 of the compartment is hinged to the floor of the compartment at 140 so that it forms a door which may be swung downward in the direction of the arrow shown in Fig. 26, when the support 127 is moved in the manner described hereinafter. The hinge 140 is provided with a suitable spring or the like by which the door 136 will be automatically brought in its closing position when the support 127 is brought to its initial position. In order to displace the support 127 a bellows 129 is provided, the legs of which are hinged to a fixed portion 141 and the vertical rear wall 142 of the support 127, respectively. 143 is a pipe connecting the bellows 129 to one of the passages 13 shown in Fig. 4. 138 is a helical spring the ends of which are secured to the fixed member 141 and to the support 127, respectively. 135 is a buffer secured to the front edge of the support 127 in order to swing downward the door 136 when the support is displaced in a forward direction by means of the bellows 129.

130 is a circular disc mounted on the support 127 and designed as a carrier for an article to be displayed, for instance a shoe 144, shown in Fig. 26. In order to rotate the disc 130 the shaft 137 thereof is provided with a pulley 131 having a grooved rim which is engaged by a cord 133 one end of which is secured to the movable leg of a bellows 132, the other leg of which is secured to the vertical wall 142. The other end of the cord 133 is secured to a helical spring 134, the other end of which is connected to the support 127 or the rear wall 142 thereof. 145 is a pipe connecting the bellows 132 to one of the passages 13, as shown in Fig. 4.

The operation of this device is as follows: At the beginning of an operating cycle the parts are in the position shown in Fig. 25 in which the support 127 is entirely within the compartment 126, the front door 136 being closed. The bellows 129 and 132 are controlled in such manner that the bellows 129 is inflated first so that the support 127 will be displaced so as to open the door 136 which will assume a horizontal position as shown in Fig. 24. The support 127 will be displaced so as to rest entirely upon the door 136. When this position is reached the bellows 132 is inflated causing a rotation of the disc 130 so that the article resting thereon is displayed from all sides. Then the delivery of compressed air to the bellows 132 is shut off so that the spring 128 will reverse the rotation of the disc 130, the bellows 132 being brought into its inoperative position. Then the delivery of compressed air to the bellows 129 will be shut off so that the spring 138 restores the support 127 to its initial position, the door 136 being closed by the spring associated with the hinge 140. If desired the bellows 129 and 132 may be controlled in such manner that their operations partly overlap each other, for instance the bellows 132 may be inflated during the last portion of the inflation of the bellows 129.

Obviously the supports 127 and the discs 130 forming part of the individual compartments may be actuated in any desired relation of time. For instance the control may be carried out in such manner that the compartments are opened and closed successively. If desired, however, a plurality of compartments may be opened simultaneously. It will be seen that a great number of varieties may be obtained by suitably distributing the perforations of the control sheet. Particularly it should be understood that the durations of opening the single compartments need not be equal but may be different from each other in any desired manner.

As will be seen from the foregoing description figures and articles of any kind may be actuated in accordance to my invention which is not limited to the actuating of the figures or compartments shown in the drawings.

I wish it to be understood that I do not desire to be limited to the exact details of construction shown and described for obvious modifications will occur to a person skilled in the art. Particularly a figure in this specification comprises not only a human body but also any other movable members, for instance as shown in Figs. 24 to 26.

In the claims affixed to this specification no selection of any particular modification of the invention is intended to the exclusion of other modifications thereof and the right to subsequently make claim to any modification not covered by these claims is expressly reserved.

I claim:

1. In apparatus for operating an automaton the combination comprising a chest in which there obtains a pressure differing from atmospheric pressure, a perforated comb mounted in said chest, a perforated sheet adapted to be moved over said comb, a bellows, a tube connecting said bellows to said comb, said bellows having an air port therein, a valve member on said bellows, said valve member being adapted to cooperate with said air port, and a tube connecting said valve member to said perforated comb, the arrangement being such that said valve member closes said air port before said bellows is connected to the chest for its actuation.

2. Apparatus according to claim 1, wherein the tube connected to the valve member is smaller in diameter than the tube connecting the bellows to the comb, said smaller tube being located in the larger tube in the perforated comb in such a position that it is exposed by the perforated sheet before the larger tube.

3. An apparatus according to claim 1, wherein the perforation in the comb is divided into two portions of different cross sectional area, the tube connected to the valve member being connected to the portion of the perforation of smaller cross section and the tube connected to the bellows being connected to the portion of larger cross section, the portion of smaller cross section being arranged to be exposed prior to the portion of larger cross section.

4. Apparatus according to claim 1, wherein the comb after being perforated is cut into two portions, and a partition is fitted between the two portions, the two portions and partition being glued together whereby the perforation is divided into two portions of different cross sectional area.

5. Apparatus according to claim 1, wherein said chest has an air port and a port communicating with a source of pressure differing from atmospheric pressure, a slide mounted in said chest, said slide being actuated by said perforated sheet in the end positions of said sheet, said slide in one position closing said air port and opening the second port and in another position opening said port and closing the second port.

6. Apparatus according to claim 1, including a talking machine having a turntable, a motor operatively connected to said turntable, said motor being operatively connected to said perforated sheet for driving the same.

7. Apparatus according to claim 1, including driving mechanism for said perforated sheet, and clutch mechanism associated with said driving mechanism, said clutch mechanism serving to reverse the direction of movement of the perforated sheet, when it reaches its end positions.

8. Apparatus according to claim 1, wherein said bellows form the joints of an automaton, hollow tubular parts forming other parts of said automaton, said tubular parts forming means of communication between said bellows forming the joints.

9. Apparatus according to claim 1, wherein said bellows form the joints of an automaton, hollow tubular parts forming other parts of said automaton, said tubular parts forming means of communication between said bellows forming the joints, and means restricting expansion of said bellows on one side thereof.

10. Apparatus according to claim 1, including an automaton having an inflatable portion, and a tube connecting said inflatable portion to said comb.

11. Apparatus according to claim 1, wherein said bellows form the joints of an automaton, hollow tubular parts forming other parts of said automaton, said tubular parts forming means of communication between said bellows forming the joints, separate tubular portions communicating with different bellows.

12. Apparatus according to claim 1, including an automaton, said bellows being located outside said automaton, and separate rods connecting said bellows to different parts of said automaton, the arrangement being such that according to the actuation of the bellows the automaton is caused to assume standing and seated positions.

13. Apparatus according to claim 1, including a platform, an automaton supported on said platform, and means associated with said chest for traversing said automaton on said platform.

14. In apparatus for operating an automaton, the combination comprising a chest in which a pressure differing from atmospheric obtains, a perforated comb mounted in said chest, a perforated sheet adapted to be moved over said comb, a plurality of bellows, a plurality of tubes adapted each to connect one of said bellows to one of said perforations in said tubes, means controlling the speed of inflation and deflation of said bellows, and sprocket wheels for driving said perforated sheet, said perforated sheet being provided with marginal perforations for engagement with said sprocket wheels.

GEORG LIWSCHÜTZ.